(12) United States Patent
Barbat et al.

(10) Patent No.: US 10,059,234 B2
(45) Date of Patent: Aug. 28, 2018

(54) VEHICLE SEATBACK

(71) Applicant: Ford Global Technologies, LLC, Dearborn, MI (US)

(72) Inventors: Saeed David Barbat, Novi, MI (US); Dean M. Jaradi, Macomb, MI (US); S. M. Iskander Farooq, Novi, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/178,969

(22) Filed: Jun. 10, 2016

(65) Prior Publication Data
US 2017/0355288 A1    Dec. 14, 2017

(51) Int. Cl.
*B60N 2/427* (2006.01)
*B60N 2/00* (2006.01)
*B60N 2/42* (2006.01)

(52) U.S. Cl.
CPC ......... *B60N 2/42745* (2013.01); *B60N 2/002* (2013.01); *B60N 2/4221* (2013.01); *B60N 2/42772* (2013.01)

(58) Field of Classification Search
CPC ............ B60N 2/42745; B60N 2/42772; B60N 2/4221; B60N 2/002; B60N 2/4885; B60N 2/4228
See application file for complete search history.

(56) References Cited

U.S. PATENT DOCUMENTS

| 3,101,186 | A | * | 8/1963 | De Haan | B60N 2/1835 248/575 |
|---|---|---|---|---|---|
| 4,641,884 | A | * | 2/1987 | Miyashita | B60N 2/2222 297/284.1 |
| 4,881,754 | A | | 11/1989 | Lutze et al. | |
| 5,145,233 | A | * | 9/1992 | Nagashima | B60N 2/4855 297/403 |
| 5,295,729 | A | * | 3/1994 | Viano | B60N 2/4228 297/216.14 |
| 5,320,308 | A | * | 6/1994 | Bilezikjian | B60N 2/2227 244/122 R |
| 5,378,043 | A | * | 1/1995 | Viano | B60N 2/4808 297/216.12 |

(Continued)

FOREIGN PATENT DOCUMENTS

| DE | 19743339 A1 | 4/1998 |
|---|---|---|
| DE | 19921821 A1 | 11/2000 |

(Continued)

OTHER PUBLICATIONS

UKIPO Search Report for Application No. GB1708977.2 dated Dec. 7, 2017 (4 pages).

*Primary Examiner* — Paul N Dickson
*Assistant Examiner* — Timothy Wilhelm
(74) *Attorney, Agent, or Firm* — Frfank A. MacKenzie; Bejin Bieneman PLC

(57) ABSTRACT

A seatback includes a lower frame, an upper frame, and a hinge coupling the lower and upper frames. An actuator is fixed relative to the lower frame, and a cable extends from the actuator to the upper frame. In the event of a collision, the actuator pulls the cable, and the upper frame moves from an upright position to a bent position relative to the lower frame.

17 Claims, 7 Drawing Sheets

(56) References Cited

U.S. PATENT DOCUMENTS

| | | | | |
|---|---|---|---|---|
| 5,454,622 A * | 10/1995 | Demopoulos | B60N 2/4221 | 188/374 |
| 5,681,081 A * | 10/1997 | Lindner | B60N 2/3011 | 280/808 |
| 5,795,019 A * | 8/1998 | Wieclawski | B60N 2/2222 | 297/216.12 |
| 5,823,619 A * | 10/1998 | Heilig | B60N 2/4829 | 297/216.12 |
| 5,833,312 A * | 11/1998 | Lenz | B60N 2/427 | 280/730.1 |
| 5,836,648 A * | 11/1998 | Karschin | B60N 2/2222 | 297/216.12 |
| 5,882,071 A * | 3/1999 | Fohl | B60N 2/4852 | 297/216.12 |
| 5,927,804 A * | 7/1999 | Cuevas | B60N 2/4838 | 297/216.12 |
| 6,019,424 A * | 2/2000 | Ruckert | B60N 2/2222 | 297/216.12 |
| 6,022,074 A * | 2/2000 | Swedenklef | B60N 2/2222 | 297/216.13 |
| 6,050,637 A * | 4/2000 | Håland | B60N 2/4228 | 297/216.1 |
| 6,135,561 A * | 10/2000 | Kruger | B60N 2/4885 | 297/216.1 |
| 6,250,714 B1 * | 6/2001 | Nakano | B60N 2/4838 | 297/216.12 |
| 6,273,511 B1 * | 8/2001 | Wieclawski | B60N 2/4885 | 297/216.12 |
| 6,312,050 B1 * | 11/2001 | Eklind | B60N 2/4221 | 297/216.15 |
| 6,364,414 B1 * | 4/2002 | Specht | B60N 2/4829 | 297/216.13 |
| 6,375,262 B1 * | 4/2002 | Watanabe | B60N 2/4228 | 297/216.12 |
| 6,398,299 B1 * | 6/2002 | Angerer | B60N 2/4808 | 297/216.12 |
| 6,416,125 B1 * | 7/2002 | Shah | B60N 2/2222 | 297/216.12 |
| 6,478,373 B1 * | 11/2002 | Hake | B60N 2/4814 | 297/216.12 |
| 6,568,754 B1 * | 5/2003 | Norton | B60N 2/4864 | 297/216.12 |
| 6,631,955 B2 * | 10/2003 | Humer | B60N 2/4838 | 297/216.12 |
| 6,634,707 B2 * | 10/2003 | Masuda | B60N 2/4852 | 297/216.1 |
| 6,666,508 B1 * | 12/2003 | Hofmann | B60N 2/4214 | 297/216.1 |
| 6,702,377 B2 * | 3/2004 | Nakano | B60N 2/4808 | 297/216.12 |
| 6,719,368 B1 * | 4/2004 | Neale | B60N 2/42727 | 297/216.12 |
| 6,746,078 B2 * | 6/2004 | Breed | B60N 2/002 | 297/216.1 |
| 6,749,256 B1 * | 6/2004 | Klier | B60N 2/4228 | 297/216.12 |
| 6,767,064 B2 * | 7/2004 | Veine | B60N 2/4864 | 297/391 |
| 6,779,840 B1 * | 8/2004 | Farquhar | B60N 2/4228 | 297/216.12 |
| 6,783,177 B1 * | 8/2004 | Nakano | B60N 2/4817 | 297/216.12 |
| 6,802,562 B1 * | 10/2004 | Hake | B60N 2/4814 | 297/216.12 |
| 6,840,560 B2 * | 1/2005 | Flogard | B60N 2/4228 | 296/187.11 |
| 6,938,953 B2 * | 9/2005 | Håland | B60N 2/4838 | 297/216.12 |
| 6,983,989 B1 * | 1/2006 | Veine | B60N 2/4864 | 297/216.12 |
| 6,983,996 B2 * | 1/2006 | Svantesson | B60N 2/4852 | 297/216.12 |
| 7,017,989 B2 * | 3/2006 | Yamaguchi | B60N 2/0276 | 297/216.12 |
| 7,070,236 B2 * | 7/2006 | Kawashima | B60N 2/4228 | 297/216.1 |
| 7,077,472 B2 * | 7/2006 | Steffens, Jr. | B60N 2/42781 | 297/216.12 |
| 7,097,242 B2 * | 8/2006 | Farquhar | B60N 2/4228 | 297/216.12 |
| 7,137,664 B2 * | 11/2006 | McMillen | B60N 2/20 | 297/284.1 |
| 7,145,263 B2 * | 12/2006 | Nathan | B60N 2/002 | 180/271 |
| 7,163,261 B2 * | 1/2007 | Kawashima | B60N 2/42745 | 297/216.12 |
| 7,185,950 B2 * | 3/2007 | Pettersson | B60N 2/42781 | 297/216.12 |
| 7,188,894 B2 * | 3/2007 | Humer | B60N 2/42781 | 297/216.12 |
| 7,234,769 B2 * | 6/2007 | Takenaka | B60N 2/42745 | 297/216.12 |
| 7,401,852 B2 * | 7/2008 | Humer | B60N 2/4228 | 297/216.1 |
| 7,422,280 B2 * | 9/2008 | Brockman | B60N 2/43 | 297/216.12 |
| 7,455,357 B2 * | 11/2008 | Humer | B60N 2/4838 | 297/216.12 |
| 7,488,035 B2 * | 2/2009 | Kawashima | B60N 2/42745 | 297/216.12 |
| 7,540,562 B2 * | 6/2009 | Sekida | B60N 2/4885 | 297/216.12 |
| 7,588,115 B2 * | 9/2009 | Breed | B60N 2/0232 | 180/271 |
| 7,588,289 B2 * | 9/2009 | Bostrom | B60N 2/4885 | 297/216.12 |
| 7,641,280 B2 * | 1/2010 | Uno | B60N 2/4228 | 297/216.12 |
| 7,677,659 B2 * | 3/2010 | Humer | B60N 2/4228 | 297/216.1 |
| 7,699,394 B2 * | 4/2010 | Humer | B60N 2/4885 | 297/216.12 |
| 7,758,114 B2 * | 7/2010 | Yokota | B60N 2/4838 | 297/216.12 |
| 7,758,115 B2 * | 7/2010 | Yamaguchi | B60N 2/4885 | 297/216.12 |
| 7,845,729 B2 * | 12/2010 | Yamada | B60N 2/0232 | 297/284.1 |
| 7,866,696 B2 * | 1/2011 | Wang | B60N 2/0276 | 280/748 |
| 7,963,599 B2 * | 6/2011 | Omori | B60N 2/4885 | 297/216.12 |
| 8,056,973 B2 * | 11/2011 | Niitsuma | B60N 2/4885 | 297/216.12 |
| 8,061,774 B2 * | 11/2011 | Omori | B60N 2/4885 | 297/216.12 |
| 8,191,965 B2 * | 6/2012 | Okimura | B60N 2/4885 | 188/290 |
| 8,197,007 B2 * | 6/2012 | Lutzka | B60N 2/4844 | 297/391 |
| 8,205,941 B2 * | 6/2012 | McFalls | B60N 2/4864 | 297/216.12 |
| 8,210,608 B2 * | 7/2012 | Igarashi | B60N 2/42781 | 297/216.12 |
| 8,226,165 B2 * | 7/2012 | Mizoi | B60N 2/4885 | 297/284.4 |
| 8,403,395 B2 * | 3/2013 | Macmanus | B60N 2/4249 | 296/68.1 |
| 8,444,219 B2 * | 5/2013 | Omori | B60N 2/4885 | 297/216.1 |
| 8,506,011 B2 * | 8/2013 | Niitsuma | B60N 2/4885 | 297/216.12 |
| 8,646,805 B2 * | 2/2014 | Goldszer | B62B 1/008 | 280/30 |
| 8,668,263 B2 * | 3/2014 | Takayasu | B60N 2/4885 | 297/216.12 |
| 8,690,238 B2 * | 4/2014 | Orzelski | B60N 2/4228 | 297/216.12 |

(56) References Cited

U.S. PATENT DOCUMENTS

| | | | |
|---|---|---|---|
| 8,905,482 B2* | 12/2014 | Rao | B60N 2/4852 297/403 |
| 2001/0038233 A1* | 11/2001 | Eklind | B60N 2/4221 297/216.13 |
| 2002/0195846 A1* | 12/2002 | Masuda | A47C 7/62 297/188.06 |
| 2006/0006709 A1* | 1/2006 | Uno | B60N 2/4228 297/216.12 |
| 2008/0073951 A1* | 3/2008 | Hattori | B60N 2/4885 297/216.12 |
| 2008/0185883 A1* | 8/2008 | Oki | B60N 2/4228 297/216.12 |
| 2010/0127540 A1 | 5/2010 | Park et al. | |
| 2010/0201167 A1 | 8/2010 | Wieclawski | |
| 2016/0176321 A1* | 6/2016 | Patalak | B60N 2/42709 29/434 |

FOREIGN PATENT DOCUMENTS

| | | | |
|---|---|---|---|
| GB | 2514925 A | 12/2014 |
| JP | H058678 A | 1/1993 |
| WO | 2007028015 A2 | 3/2007 |

* cited by examiner

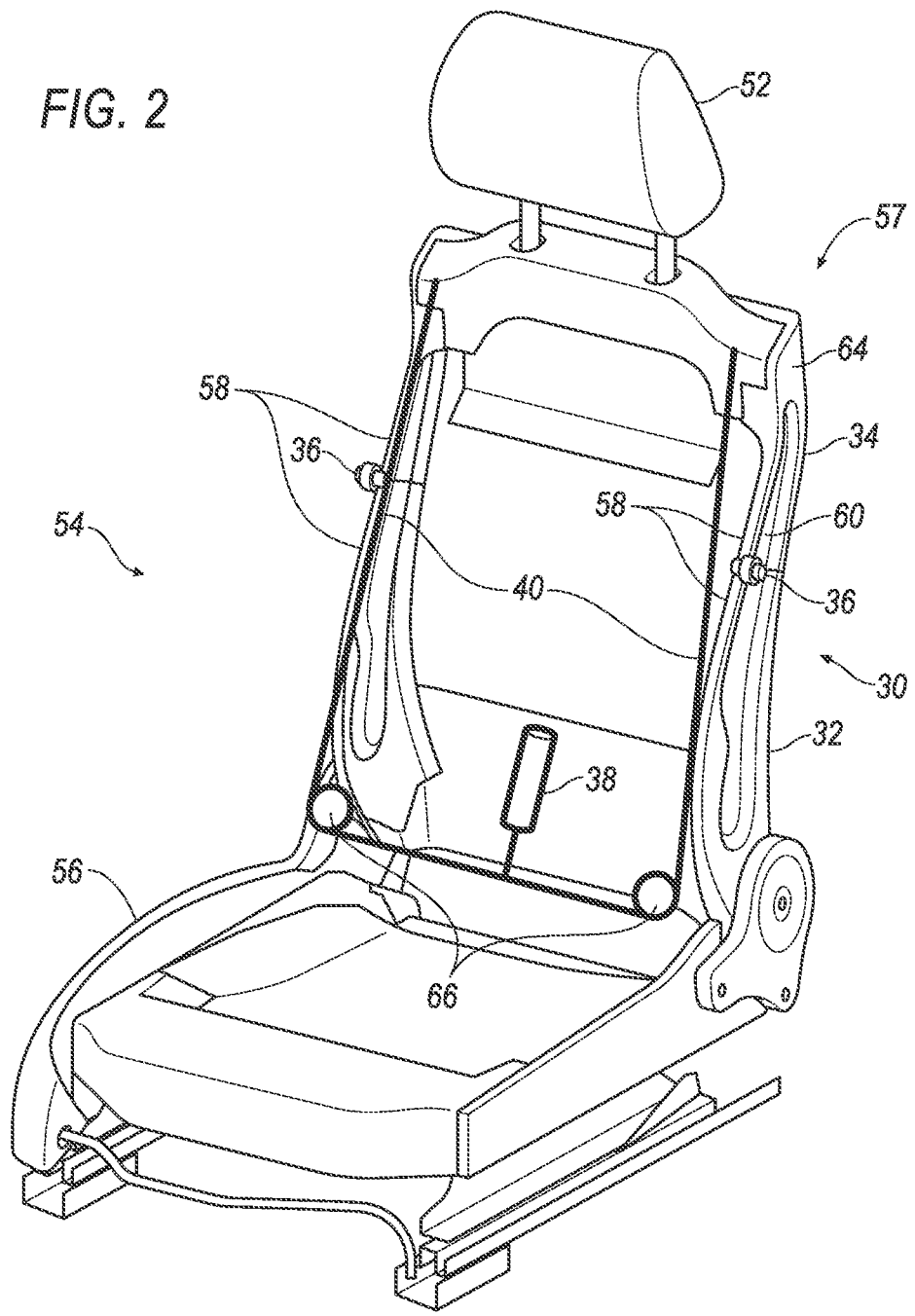

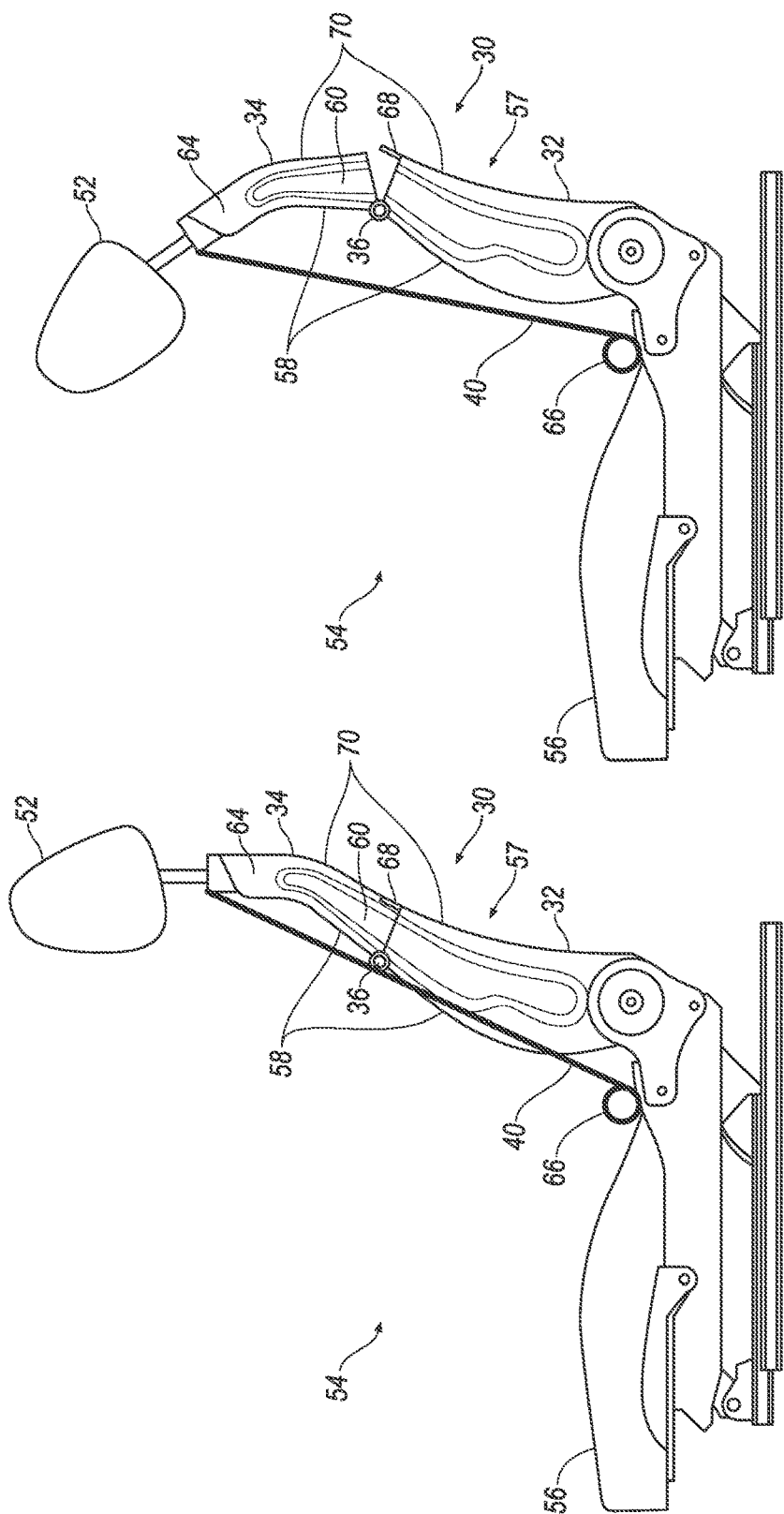

VEHICLE SEATBACK

BACKGROUND

A vehicle, such as an automobile, may include multiple rows of seating. Seats in each row may be bucket seats, bench seats, or other kinds, and the seats may face forward relative to the vehicle. The seats include seat bottoms on which occupants sit and seatbacks against which occupants rest their backs. The seat bottoms are generally horizontal and the seatbacks are generally upright.

In a frontal vehicle collision, an occupant may contact the seatbacks of the row of seating on front of the occupant. In a vehicle collision, the vehicle decelerates before the occupant decelerates. When the vehicle has decelerated but the occupant still has forward momentum, the occupant leans forward. This motion may bring the head of the occupant in contact with the seatback in front of the occupant.

BRIEF DESCRIPTION OF THE DRAWINGS

FIG. 2 is a perspective view of a seat frame of the front seat.

FIG. 3A is a side view of the seat frame with an upper frame in an upright position.

FIG. 3B is a side view of the seat frame with the upper frame in a bent position.

DETAILED DESCRIPTION

Figure 1:
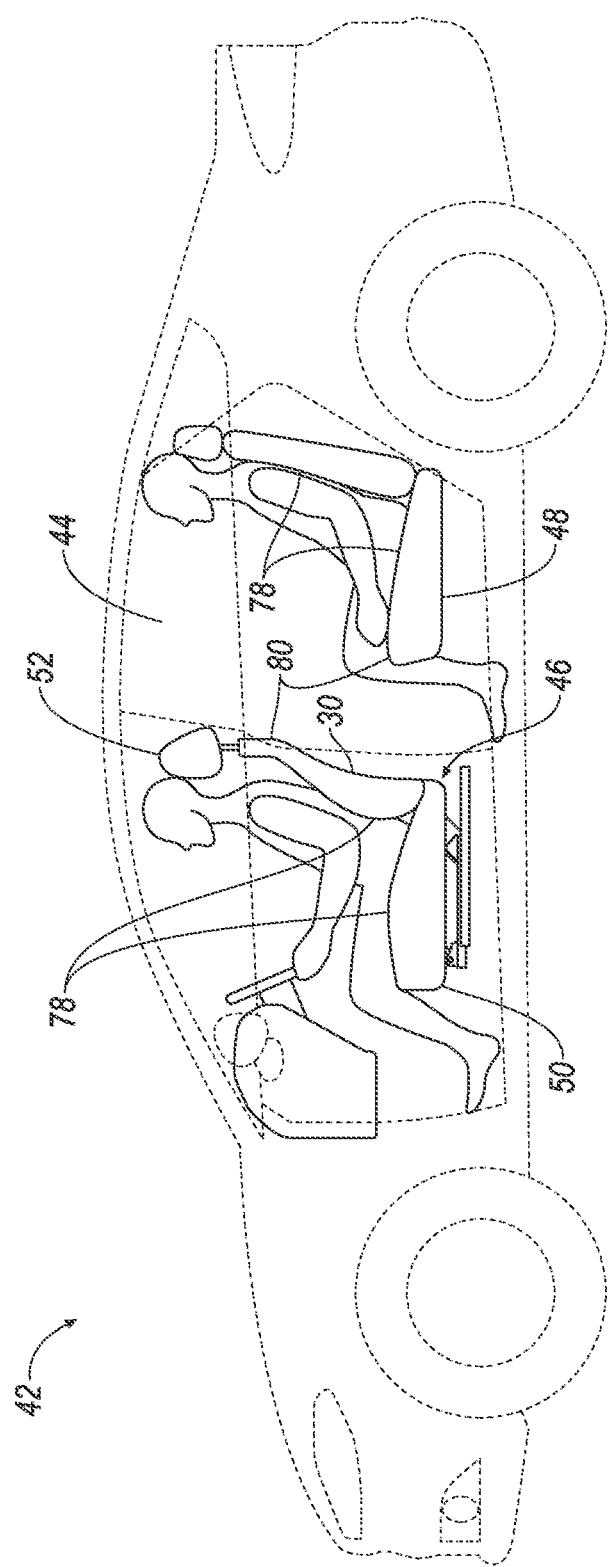
FIG. 1 is a side view of a vehicle including a front seat and a rear seat.

With reference to the Figures, wherein like numerals indicate like parts throughout the several views, a seatback 30 for a vehicle 42 includes a lower frame 32, an upper frame 34, and a hinge 36 coupling the lower and upper frames 32, 34. An actuator 38 is fixed relative to the lower frame 32, and a cable 40 extends from the actuator 38 to the upper frame 34.

During a collision of the vehicle 42, e.g., a frontal collision, the actuator 38 may be triggered to pull the upper frame 34 forward relative to the lower frame 32 to move seatback 30 out of the way of an occupant seated behind the seatback 30. This reduces the likelihood of that occupant seated behind the seatback 30 contacts the seatback 30, which may reduce the likelihood of injury to the occupant.

As shown in FIG. 1, the vehicle 42 includes a passenger cabin 44 to house occupants of the vehicle 42. The passenger cabin 44 includes one or more front seats 46 disposed at a front of the passenger cabin 44 and one or more rear seats 48 disposed behind the front seats 46. The passenger cabin 44 may also include third-row seats (not shown) at a rear of the passenger cabin 44. In the Figures, the front seat 46 is shown to be a bucket seat, but the front and rear seats 46, 48 may be other types. The position and orientation of the front and rear seats 46, 48 and components thereof may be adjustable by an occupant.

The front seat 46 may include the seatback 30, a seat bottom 50, and a headrest 52. The headrest 52 may be supported by the seatback 30 and may be stationary or movable relative to the seatback 30. The seatback 30 may be supported by the seat bottom 50 and may be stationary or adjustable relative to the seat bottom 50. The seatback 30, the seat bottom 50, and/or the headrest 52 may be adjustable in multiple degrees of freedom. Specifically, the seatback 30, the seat bottom 50, and/or the headrest 52 may themselves be adjustable, in other words, adjustable components within the seat back, the seat bottom 50, and/or the headrest 52, and/or may be adjustable relative to each other.

As shown in FIG. 2, a seat frame 54 includes a seat-bottom frame 56, and a seatback frame 57. The seatback frame 57 includes the lower frame 32 and the upper frame 34. The seat-bottom frame 56 may be a component of the seat bottom 50. The lower frame 32 may be coupled to the seat-bottom frame 56. The lower frame 32 and the seat-bottom frame 56 may be adjustable relative to each other. The lower and upper frames 32, 34 are components of the seatback 30. The seat frame 54 may include panels and/or may include tubes, beams, etc.

The seat frame 54 may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

Figure 4A:
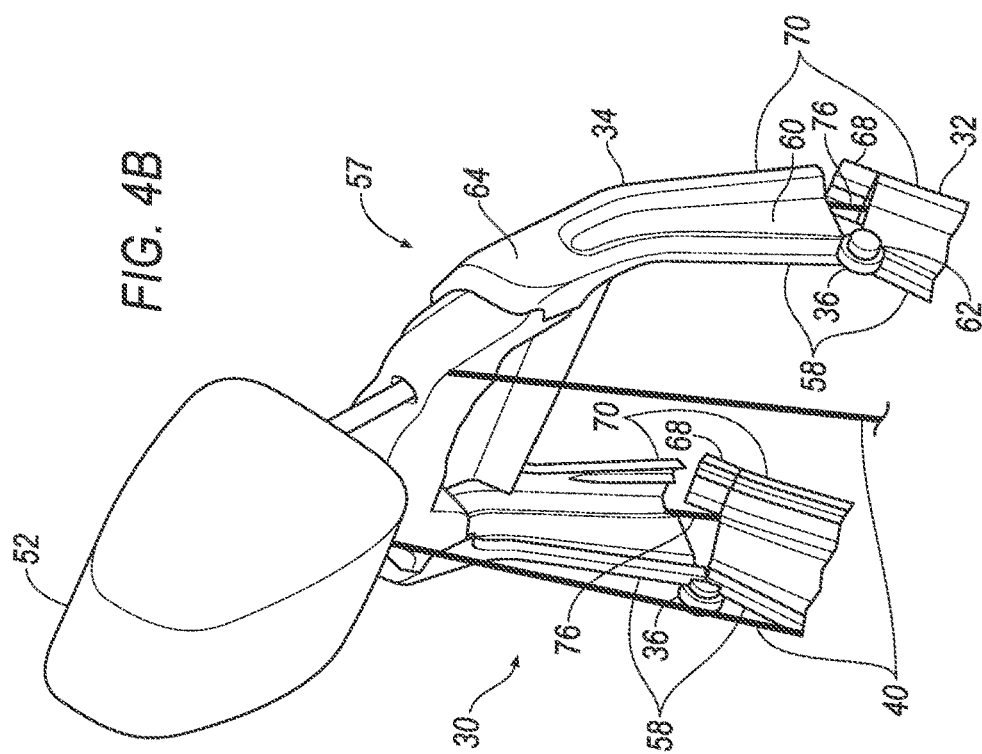
FIG. 4A is a perspective view of a portion of the seat frame with the upper frame in the upright position.
Figure 4B:
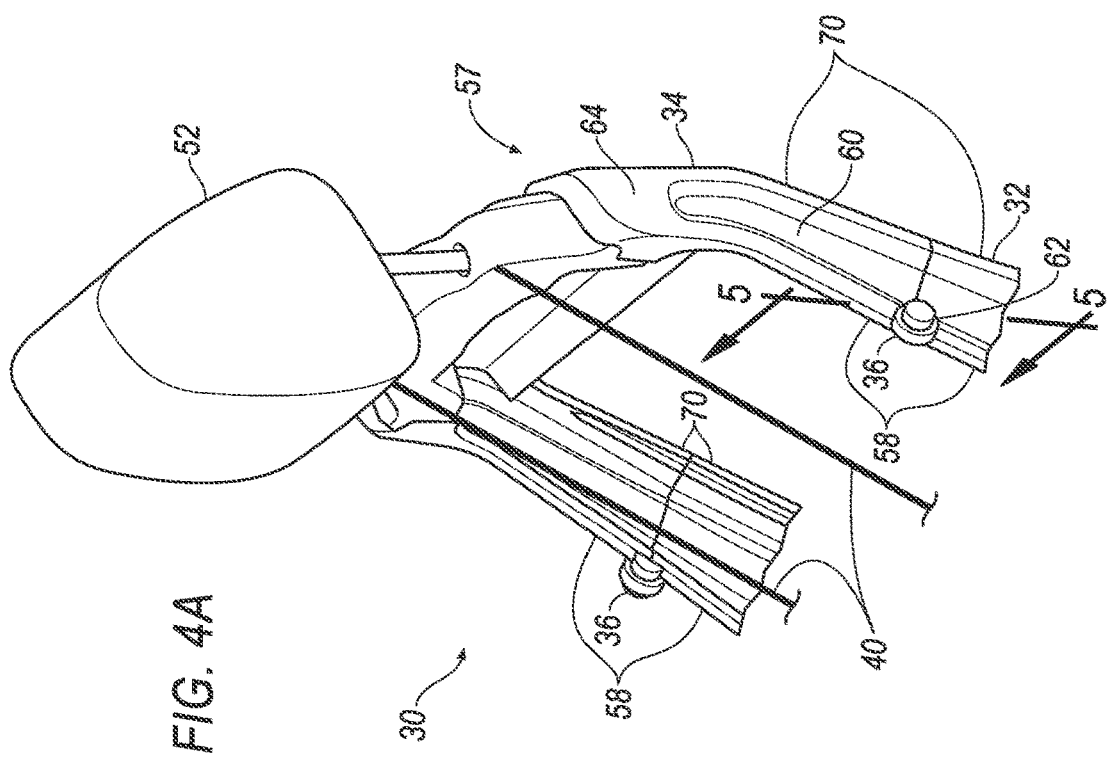
FIG. 4B is a perspective view of a portion of the seat frame with the upper frame in the bent position.
Figure 7:
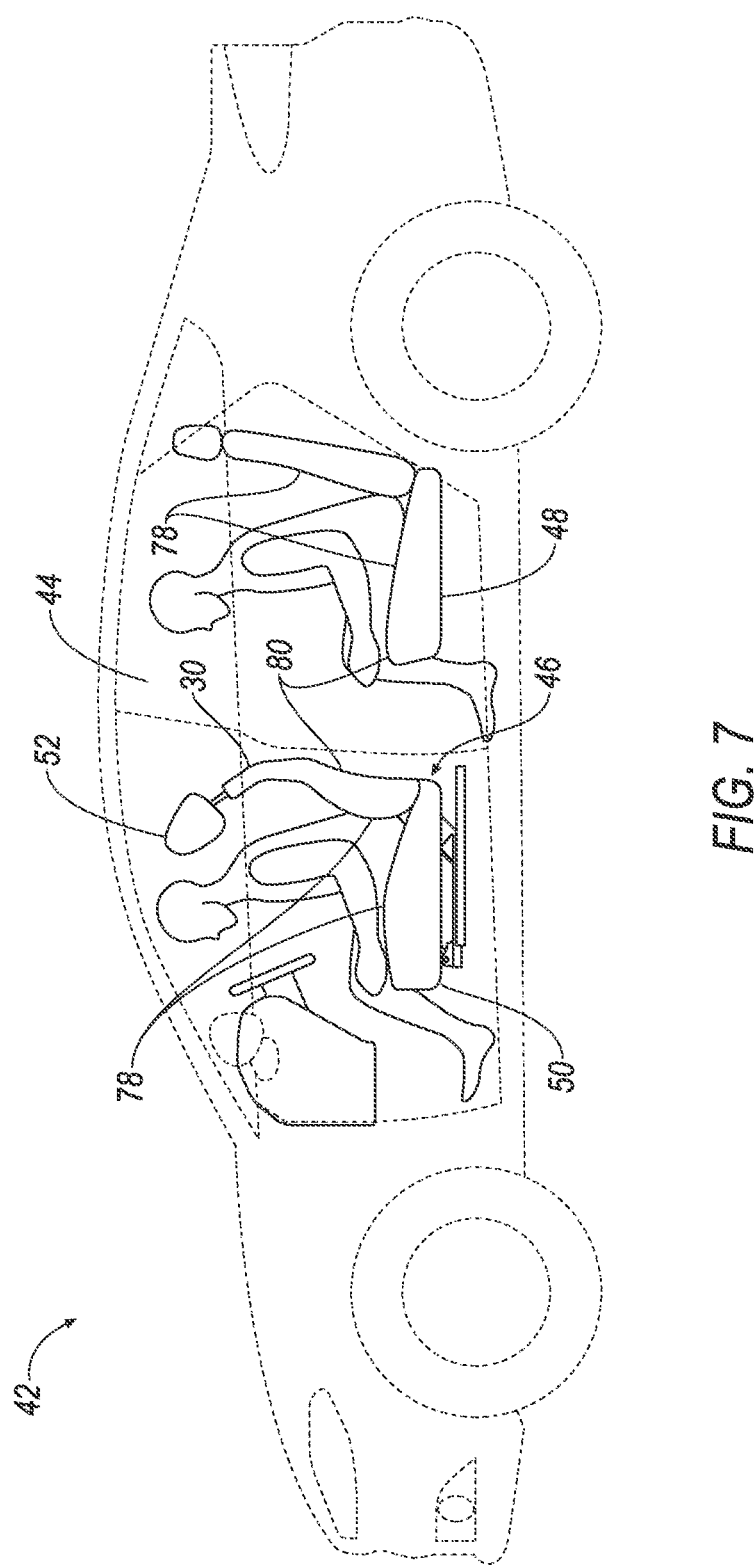
FIG. 7 is a side view of the vehicle with the upper frame of the front seat in the bent position.

The upper frame 34 is rotatably coupled to the lower frame 32 to allow the seatback 30 to rotate from an upright position (as shown in FIGS. 1-3A, 4A, and 5) to a bent position (as shown in FIGS. 3B, 4B, and 7). For example, the hinge 36 may couple the lower and upper frames 32, 34. The hinge 36 may be coupled to a lower end 60 of the upper frame 34. The hinge 36 allows the upper frame 34 to rotate about the hinge 36 relative to the lower frame 32, as shown in FIGS. 3A and 3B. Multiple hinges 36 along an axis may couple the lower and upper frames 32, 34.

The lower and upper frames 32, 34 may have respective first sides 58 to which the hinge 36 is coupled. (The adjectives "first" and "second" are used throughout this document as identifiers and are not intended to signify importance or order.) The first sides 58 may face a vehicle-forward direction, i.e., a forward direction relative to the vehicle 42.

As shown in FIGS. 4A and 4B, the hinge 36 may include a spring 62 biasing the upper frame 34 toward the upright position. The spring 62 may be loaded in tension or compression when the upper frame 34 is in an upright position, and the spring 62 may be further loaded in either tension or compression when the upper frame 34 moves to a bent position. The spring 62 may be a spiral torsion spring or any other suitable type of spring.

As shown in FIG. 2, the actuator 38 may be fixed relative to the lower frame 32. The actuator 38 may be attached to, for example, the lower frame 32 or the seat-bottom frame 56.

The actuator 38 may be, for example, a pyrotechnic actuator. When the actuator 38 actuates, the actuator 38 pulls the cable 40. After pulling the cable 40, the actuator 38 may allow the cable 40 to move freely; for example, the cable 40 may be pulled into the actuator 38 and then allowed to slide out of the actuator 38.

The cable 40 extends from the actuator 38 to the upper frame 34. Specifically, the cable 40 extends to an upper end 64 of the upper frame 34. The cable 40 may be formed of, for example, steel wires or any other suitable material and structure. Multiple cables 40 may extend from the actuator 38 to the upper frame 34.

As shown in FIGS. 3A and 3B, the cable 40 is movable from an undeployed position to a deployed position. In the undeployed position, as shown in FIG. 3A, the cable 40 is positioned to allow the upper frame 34 to be in the upright position under the bias of the spring 62. In the undeployed position, the cable 40 may be loose relative to the lower and upper frames 32, 34 and may be routed along the lower and upper frames 32, 34, adjacent the lower and upper frames 32, 34. In the deployed position, as shown in FIG. 3B, the cable 40 is in tension between the actuator 38 and the upper frame 34 and has pulled the upper frame 34 from the upright position to the bent position. In the deployed position, the cable 40 is disposed in the forward direction relative to the hinge 36.

A pulley or pulleys 66 may guide the cable 40 between the actuator 38 and the upper frame 34. The pulley 66 may be attached to, for example, the lower frame 32 or the seat-bottom frame 56. The pulley 66 may be disposed so that the cable 40, when taut, passes in front of the hinge 36, that is, in a vehicle-forward direction from the hinge 36. If there are multiple cables 40, a pulley 66 may guide each cable 40 between the actuator 38 and the upper frame 34.

As shown in FIGS. 4A and 4B, a bracket or brackets 68 may connect the lower and upper frames 32, 34. The lower and upper frames 32, 34 may have respective second sides 70, and the bracket 68 may contact the lower and upper frames 32, 34 at the second sides 70. The second sides 70 may face a different direction from the respective first sides 58, e.g., an opposite direction from the respective first sides 58. The second sides 70 as depicted in the Figures are rear-facing, i.e., facing in a vehicle-rearward direction, but the second sides 70 to which the bracket 68 connects may be, for example, lateral sides.

The bracket 68 may be attached to the lower and upper frames 32, 34. The bracket 68, and/or the connection between the bracket 68 and the lower and upper frames 32, 34, may be frangible relative to the lower frame 32 and/or upper frame 34. In other words, the bracket 68 may break before the lower and upper frames 32, 34 when subjected to force, e.g., by the cable 40 and actuator 38. In the alternative, or in addition, the connection between the bracket 68 and the lower or upper frame 32, 34 may break before the lower and upper frames 32, 34 when subjected to force, e.g., by the cable 40 and actuator 38.

More specifically, if the upper frame 34 is biased in the vehicle-forward direction relative to the lower frame 32, the bracket 68 prevents movement of the upper frame 34 about the hinge 36 unless the force exerted on the bracket 68 exceeds a threshold. If the force on the bracket 68 exceeds the threshold, the bracket 68 breaks, allowing the upper frame 34 to move from the upright position to the bent position. The threshold force may be low enough that the force will not break or plastically deform the seat frame 54 or the cable 40. The actuator 38 is configured to exert a tensile force on the cable 40 in excess of the threshold force.

Figure 5:
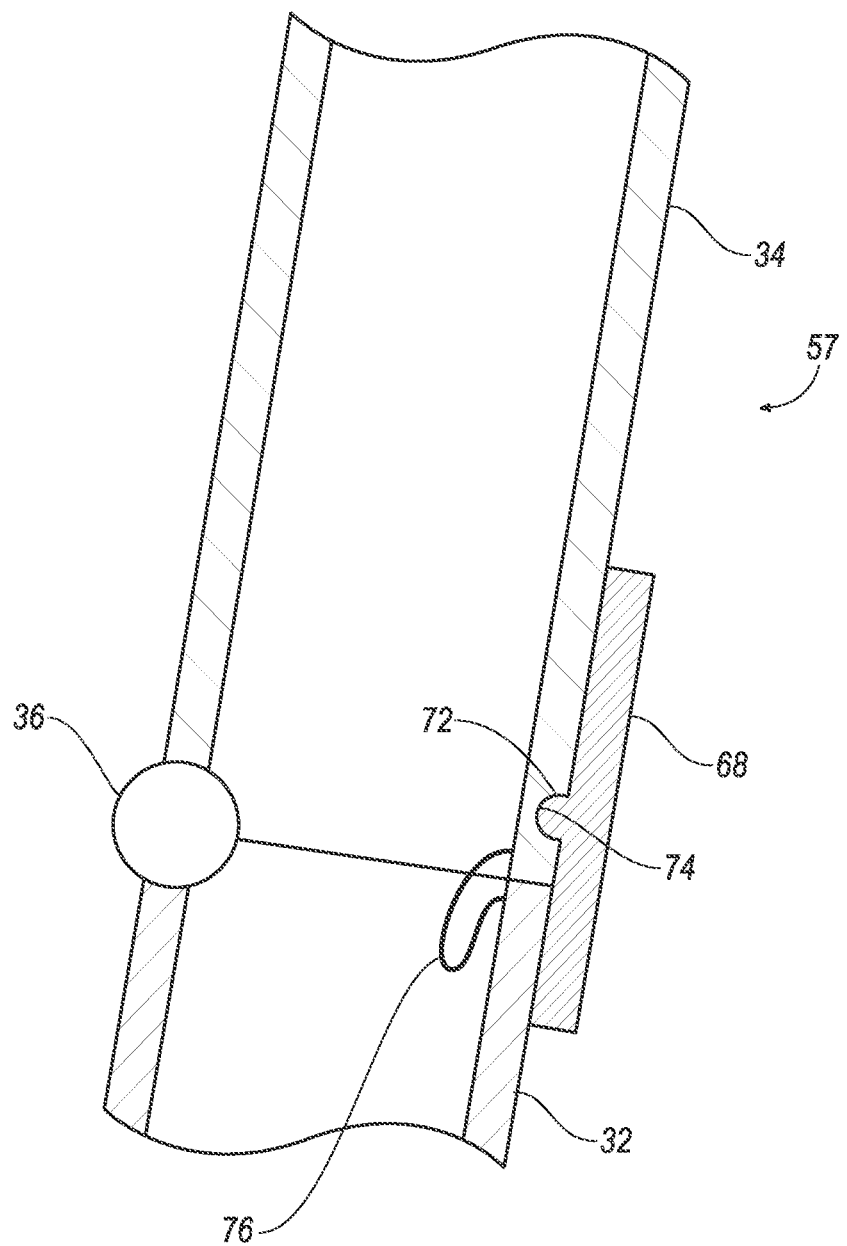
FIG. 5 is a cross-sectional view a portion of the seat frame.

With reference to FIG. 5, the bracket 68 is fixed, e.g., welded, adhered, etc., to one of the lower and upper frames 32, 34 and is engaged with the other of the lower and upper frames 32, 34 by engagement of a bump 74 with a depression 72 between the bracket 68 and the other of the lower and upper frames 32, 34. The bump 74 is sized to engage the depression 72, i.e., the bump is press-fit in the depression. When the upper frame 34 is in the upright position, the depression 72 is engaged with the bump 74. The engagement of the bump 74 and the depression 72 prevents the bump 74 from sliding away from the depression 72 unless the force biasing the bump 74 away from the depression 72 exceeds a threshold. The actuator 38 is configured to exert a tensile force on the cable 40 in excess of the threshold force.

The bracket 68 may be fixed to one of the lower frame 32 and the upper frame 34; one of the bump 74 or depression 72 may be on one of the bracket 68 and the other of the lower frame 32 and the upper frame 34; and the other of the bump 74 or depression 72 may be on the other of the bracket 68 and the other of the lower frame 32 and the upper frame 34. For example, as shown in FIGS. 4A-5, the bracket 68 may have the bump 74, and the upper frame 34 may have the depression 72 sized to engage the bump 74. In this configuration, the bracket 68 may be fixed to the lower frame 32. Alternatively, the lower frame 32 may have the depression 72, and the bracket 68 may be fixed to the upper frame 34. Alternatively, the bracket 68 may have the depression 72, in which case one of the lower frame 32 and the upper frame 34 may have the bump 74, and the other of the lower frame 32 and the upper frame 34 may be fixed to the bracket 68.

As shown in FIGS. 4B and 5, a tether or tethers 76 may connect the lower and upper frames 32, 34. The tether 76 may be spaced from the first sides 58 to which the hinge 36 is attached. The tether 76 may prevent the upper frame 34 from rotating more than a limit, for example, 20°, relative to the lower frame 32. The tether 76 may be formed of, for example, a fabric strap.

Alternatively or additionally to the tethers 76, the hinge 36 may include a cam or a stop (not shown) preventing rotation of the upper frame 34 relative to the lower frame 32 beyond a limit. The cam or stop may prevent rotation of the upper frame 34 by more than, for example, 20° relative to the lower frame 32 from the upright position to the bent position. The cam or stop may be, for example, a first notch in a component (not shown) of the hinge 36 that is fixed relative to the upper frame 34 and a second notch in a component (not shown) of the hinge 36 that is fixed relative to the lower frame 32, and the second notch impedes rotation of the first notch past the second notch.

As shown in FIG. 1, cushions 78 may be supported on the seat frame 54. The cushion 78 may be made of cushioning material covered with upholstery 80. The cushioning material may be formed of foam or any other suitable supportive material. The upholstery 80 may be formed of cloth, leather, faux leather, or any other suitable material. The upholstery 80 may be stitched in panels around the foam.

Figure 6:
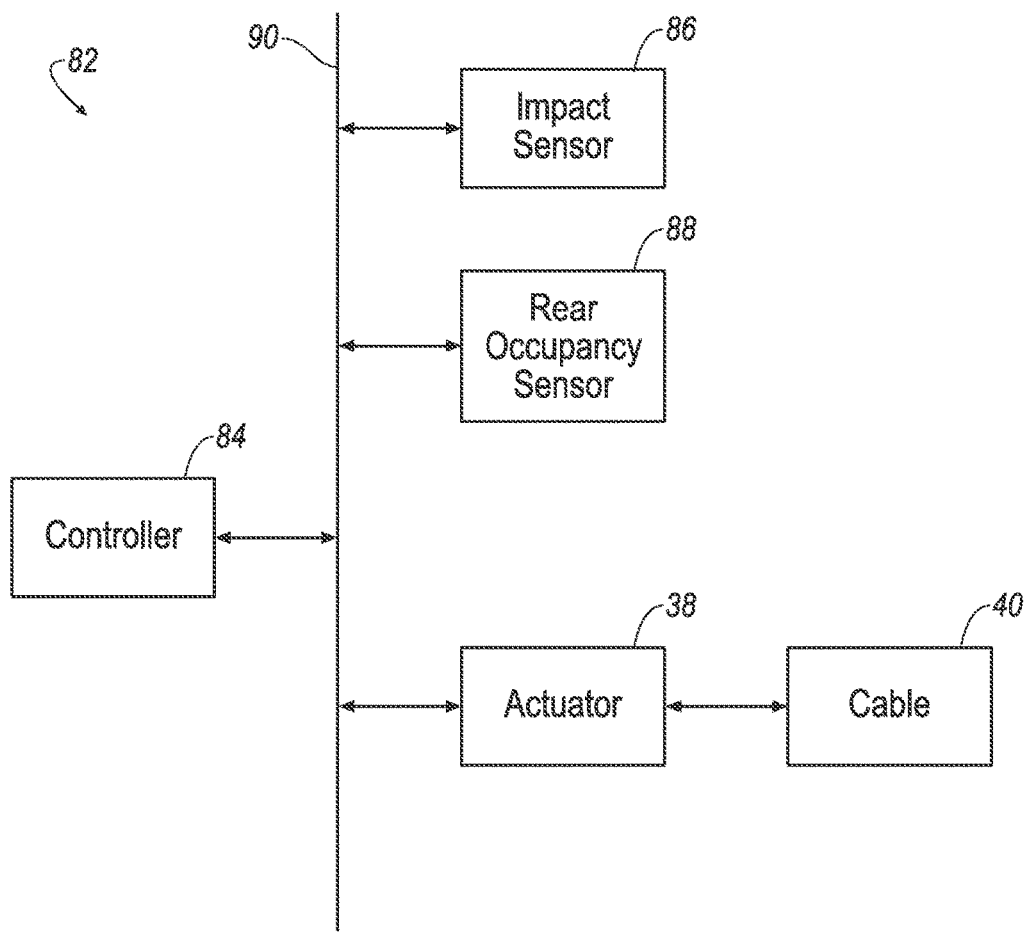
FIG. 6 is a block diagram of a control system for the seat frame.

As shown in FIG. 6, a control system 82 may be in communication with the actuator 38. The control system 82 may include the actuator 38, a controller 84, an impact sensor 86, and an occupancy sensor 88, in communication through a communications network 90.

The impact sensor 86 may be in communication with the controller 84. The impact sensor 86 is programmed to detect an impact to the vehicle 42. The impact sensor 86 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 86 may be located at numerous points in or on the vehicle 42.

The control system 82 includes an occupancy sensor 88 for a seat disposed rearward relative to the lower frame 32, e.g., the rear seat 48. The occupancy sensor 88 may be configured to detect occupancy of the rear seat 48. The occupancy sensor 88 may be visible-light or infrared cameras directed at the rear seat 48, weight sensors inside the rear seat 48, sensors detecting whether a seat belt (not shown) for the rear seat 48 is buckled or unspooled, or other suitable sensors. The occupancy sensor 88 is in communication with the controller 84 via the communications network 90.

The controller 84 may be a microprocessor-based controller. The controller 84 may include a processor, memory, etc. The memory of the controller 84 may store instructions executable by the processor.

The control system 82 may transmit signals through a communications network 90 such as a controller area network (CAN) bus, Ethernet, Local Interconnect Network (LIN), and/or by any other wired or wireless communications network.

The controller 84 may be programmed to instruct the actuator 38 to actuate in response to a frontal collision. Specifically, the controller 84 may be programmed to receive a notification of a frontal collision from the impact sensor 86, receive a notification that the rear seat 48 behind the front seat 46 is occupied, and instruct the actuator 38 to actuate in response to a frontal collision if the occupancy sensor 88 detects that the rear seat 48 is occupied.

In the event of a frontal collision, the impact sensor 86 detects the collision. The impact sensor 86 transmits a signal indicating the frontal collision through the communications network 90 to the controller 84. At some point before the collision, the occupancy sensor 88 has transmitted a signal indicating whether or not the rear seat 48 is occupied through the communications network 90 to the controller 84. If the rear seat 48 is occupied and a frontal collision is detected, the controller 84 transmits a signal through the communications network 90 to the actuator 38. The actuator 38 actuates and pulls the cable 40. Because the cable 40, when taut, passes forward of the hinge 36, the cable 40 applies a moment to the upper frame 34 relative to the lower frame 32 that causes the upper frame 34 to rotate in the vehicle-forward direction. The cable 40 moves from the undeployed position to the deployed position, and the upper frame 34 moves from the upright position to the bent position. The seatback 30 pushed by the upper frame 34 may not contact an occupant of the front seat 46, if any, because the occupant is leaning forward from the forward momentum of the occupant. The tether 76 or the cam or stop may prevent the upper frame 34 from rotating enough that the seatback 30 contacts the occupant. An occupant of the rear seat 48 may not contact the seatback 30 when the upper frame 34 is in the bent position because the seatback 30 has moved away from the occupant. Once momentum of the vehicle 42 has been reduced from the collision, the occupants lean back upright, and the occupant of the front seat 46 may rotate the upper frame 34 back to the upright position. The spring 62 may help rotate the upper frame 34 back to the upright position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a lower frame and an upper frame;
a hinge coupling the lower and upper frames;
an actuator fixed relative to the lower frame;
a cable extending from the actuator to the upper frame;
a controller in communication with the actuator and programmed to instruct the actuator to actuate in response to a frontal collision; and
an occupancy sensor for a seat disposed rearward relative to the lower frame, the occupancy sensor in communication with the controller.

2. The system of claim 1, further comprising an impact sensor in communication with the controller.

3. The system of claim 1, wherein the controller is programmed to instruct the actuator to actuate in response to a frontal collision only if the occupancy sensor detects that the seat is occupied.

4. The system of claim 1, wherein the lower and upper frames have respective first sides to which the hinge is coupled and respective second sides facing a different direction from the respective first sides, further comprising a bracket contacting the lower and upper frames at the second sides.

5. The system of claim 4, wherein the bracket is attached to the lower and upper frames and frangible relative to the cable.

6. The system of claim 4, wherein the bracket is attached to one of the lower and upper frames, one of the bracket and the other of the lower and upper frames has a depression, and the other of the bracket and the other of the lower and upper frames has a bump sized to engage the depression.

7. A seatback comprising:
a lower frame and an upper frame;
a hinge coupling the lower and upper frames, wherein the lower and upper frames have respective first sides to which the hinge is coupled and respective second sides facing a different direction from the respective first sides;
an actuator fixed relative to the lower frame;
a cable extending from the actuator to the upper frame; and
a bracket contacting the lower and upper frames at the second sides, wherein the bracket is attached to the lower and upper frames and frangible relative to the cable.

8. The seatback of claim 7, wherein the hinge is coupled to a lower end of the upper frame, and the cable is attached to an upper end of the upper frame.

9. The seatback of claim 7, wherein the bracket is attached to one of the lower and upper frames.

10. The seatback of claim 9, wherein the other of the lower and upper frames has a depression and the bracket has a bump sized to engage the depression.

11. The seatback of claim 9, wherein the bracket has a depression and the other of the lower and upper frames has a bump sized to engage the depression.

12. The seatback of claim 7, wherein the cable is movable from an undeployed position to a deployed position, the hinge is coupled to a side of the upper frame facing a forward direction, and in the deployed position the cable is disposed in the forward direction relative to the hinge.

13. The seatback of claim 7, wherein the actuator is a pyrotechnic actuator.

14. The seatback of claim 7, wherein the lower and upper frames have respective sides to which the hinge is coupled, further comprising a tether connected to the lower and upper frames, the tether spaced from the sides.

15. The seatback of claim 7, wherein the hinge includes a cam preventing rotation of the upper frame relative to the lower frame beyond a limit.

16. The seatback of claim 7, wherein the hinge includes a spring biasing the upper frame to an upright position.

17. The seatback of claim 7, further comprising a pulley guiding the cable between the actuator and the upper frame.

* * * * *